Figure 1:
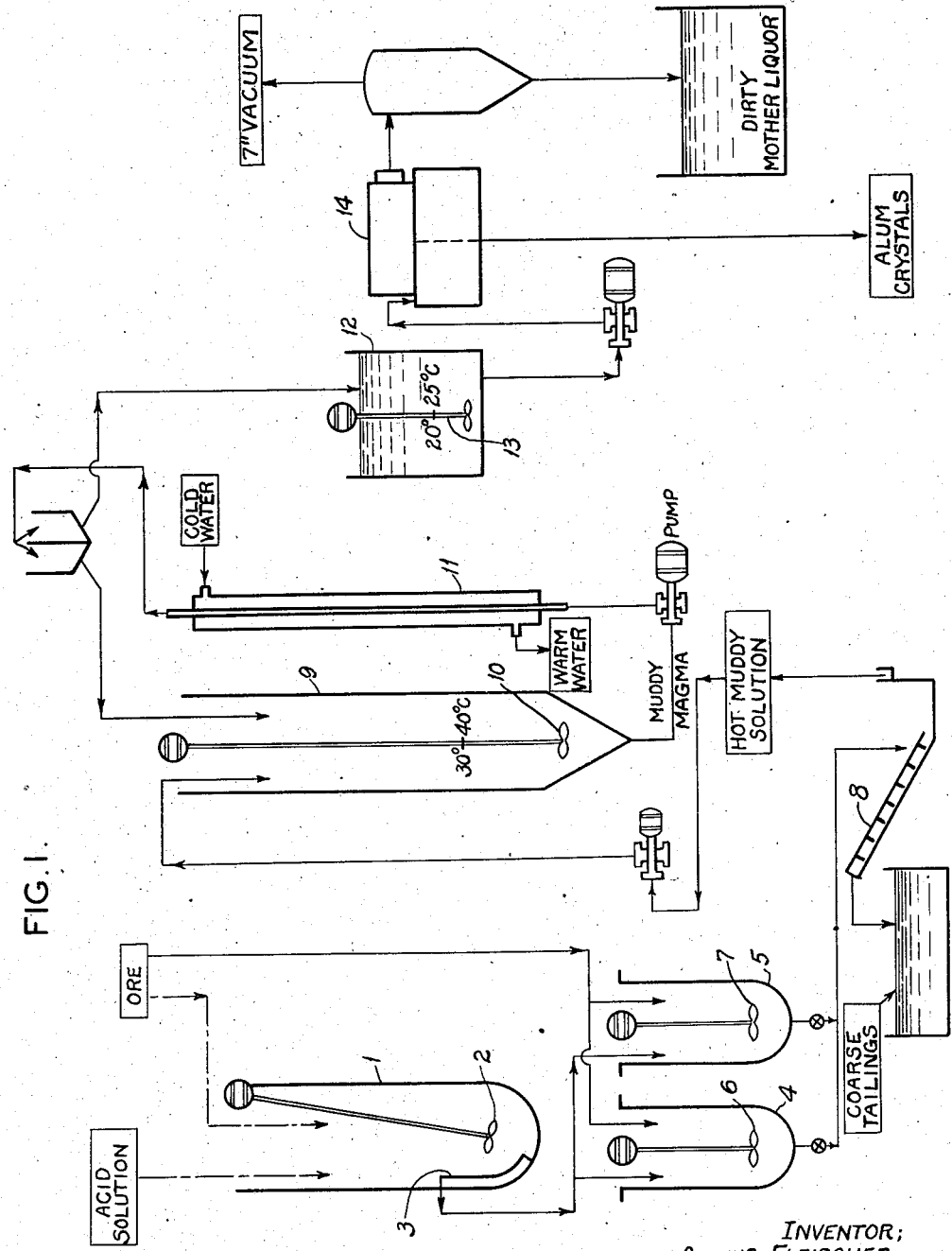

June 12, 1945. A. FLEISCHER 2,378,296
MANUFACTURE OF PURIFIED CRYSTALLINE PRODUCTS
Filed May 8, 1944 3 Sheets-Sheet 1

INVENTOR;
ARTHUR FLEISCHER
BY
ATTORNEYS

June 12, 1945.  A. FLEISCHER  2,378,296
MANUFACTURE OF PURIFIED CRYSTALLINE PRODUCTS
Filed May 8, 1944  3 Sheets-Sheet 3

INVENTOR;
ARTHUR FLEISCHER
ATTORNEYS

Patented June 12, 1945

2,378,296

UNITED STATES PATENT OFFICE 2,378,296

MANUFACTURE OF PURIFIED CRYSTALLINE PRODUCTS

Arthur Fleischer, Salt Lake City, Utah, assignor to Olin Industries, Inc., East Alton, Ill., a corporation of Delaware Application May 8, 1944, Serial No. 534,667

16 Claims. (Cl. 23—118)

This invention relates to the recovery of alum from turbid solutions such as result from the treatment of ores of alumina with sulphuric acid and a potassium or ammonium compound. This application is a continuation in part of my prior copending application Serial No. 283,537 filed July 10, 1939.

Heretofore, in the manufacture of alum (whether as an ultimate product or an intermediate step in the manufacture of alumina) the alum solution when first made is turbid with finely divided suspended insoluble impurities of the character of mud, and it has been thought that to obtain clear crystals of alum it was necessary to remove the suspended impurities before undertaking to crystallize the alum from solution. The character of these impurities is such that they tend to remain in suspension, particularly in the hot concentrated solutions which are employed, so that removal by settling is impracticable. At the same time, it is exceedingly difficult to remove them by filtration, as the material tends to clog the pores of filtering media. In such cases, it has heretofore been necessary to resort to some additional treatment in order to make the desired separation possible. For example, dilution of the solution has been found in certain cases to permit more rapid settling of the suspended material but such is unsatisfactory because of the inconvenience and cost of evaporating the additional diluent.

The term "alum," as used herein, means the double salts of aluminum sulfate and of potassium or ammonium sulfate, and which are characterized by the formulae $K_2SO_4.Al_2(SO_4)_3.24H_2O$ (or $KAl(SO_4)_2.12H_2O$) and $$(NH_4)_2SO_4.Al_2(SO_4)_3.24H_2O$$

(or $NH_4Al(SO_4)_2.12H_2O$), respectively.

In the preparation of alum from ores of alumina, in the course of which concentrated alum solutions result which contain the insoluble material from the ore in suspension, separation of the insolubles by filtration of the hot solution has been unsatisfactory since the rate, even under pressure, amounts at best to only 2 to 8 gallons per square foot of filter surface per hour and is subject to erratic variations. Furthermore, while the separation may be effected by a long settling period when the solution is first considerably diluted and cooled, this introduces the disadvantage of requiring the subsequent evaporation of considerable amounts of water for recovery of the alum.

The object of the invention is to provide a process for readily and expeditiously recovering alum from solutions which are turbid with suspended impurities derived from the ore.

In accordance with this invention, generally stated, crystals of alum are caused to form in a solution containing insoluble impurities in suspension and are then separated from the resulting mixture by simple mechanical operation. Generally, the most convenient procedure consists in producing alum crystals which are much coarser than the particles of the undesired impurities and then effecting the separation by passing the mixture through a screen of relatively coarse mesh which retains the alum crystals while permitting the passage of the mother liquor and the particles of impurities suspended therein. Other methods of obtaining the desired contaminant-free crystals may at times be advantageous; for example, when the crystals and particles differ appreciably in density though not necessarily in size, use may be made of centrifuging, settling, or other similar density-separation procedures. The improved process of my invention therefore involves the making of clear alum crystals in the presence of insoluble impurities and followed by isolation of the crystals from the mixture containing insoluble contaminant and mother liquor, which procedure offers important advantages over the prior methods in which it was essential to clarify the starting solution prior to crystallization. In order to produce crystals which are free of occluded particles of insoluble matter from the mother liquor, the present invention contemplates that the mixture, while undergoing crystallization, be maintained in a state of agitation. It has been discovered that so long as the forming and growing alum crystals are not allowed to become quiescent they do not occlude particles of impurities. When the presence of traces of impurities in the resultant product may be tolerated, however, the degree of agitation need not be such that all increments of the crystallizing mixture remain in motion.

The crystallization step of my improved process is controlled to result in alum crystals which are readily amenable to mechanical separation from the mother liquor and the associated insoluble matter. Crystals of suitable size and form which do not occlude or retain mother liquor and particles of the insoluble contaminant may be secured by proper adjustment of conditions such as the rate of agitation, the extent of supersaturation, and the presence of crystal nuclei. While, if it is compatible with other operating conditions, it is frequently desirable to permit crystallization to progress to completeness under the existing conditions, there is no necessity for so doing, and when operating conditions dictate the present invention admits of interrupting the crystallization at any time.

Following the crystallization step, and without permitting the magma to become quiescent under conditions conducive to further crystal formation and growth, the crystals may be separated from the turbid mother liquor, (i. e., mother liquor containing suspended impurities) by simple mechanical means, such as by the use of a coarse mesh screen, settling, or centrifuging, and adherent mother liquor may further be removed by washing, for example with clarified mother liquor.

It will be understood that when mechanical limitations do not permit the production of crystals sufficiently free of occluded impurities for the purpose at hand, the crystals may be further purified by redissolving, for example in clarified mother liquor, and repeating the steps of crystallization and removal of mother liquor. If desired, the solution may be readily and rapidly clarified by filtration prior to the recrystallization step, since at this stage the filtration difficulties are not encountered because the prior treatment will have removed all but a modicum of the insolubles. The resulting clear solution may likewise be employed directly in process treatment without any intermediate recrystallization step.

In the accompanying drawings several procedures are diagrammatically shown for carrying out the manufacture of alum crystals according to the present invention.

In the manufacture of alumina by processes involving the treatment of ore with sulphuric acid, the alums occupy a unique position because of favorable characteristics including a solubility-temperature curve which permits crystallization with the elimination of the harmful insoluble impurities, especially iron and silica. This is important since alumina suitable for the manufacture of metal by the Hall-Heroult process must have a high purity to avoid contamination of the metal produced in the electrolytic cell.

A 50% potassium alum solution contains equal parts of the compound $K_2SO_4.Al_2(SO_4)_3.24H_2O$ and of water, or, expressed differently, 100 parts of solution contain 27 parts of $K_2SO_4.Al_2(SO_4)_3$ and 73 parts of water. Such a solution will start to deposit crystals at 70° C. and as the temperature is lowered will continue to form crystals down to the eutectic point. If the cooling is stopped at 20° C., 1000 parts of a solution, originally of 50% concentration above 70° C., will be changed to a suspension of 440 parts of potassium alum crystals in 560 parts of mother liquor. The presence of insoluble mud derived from the ore does not interfere with these proportions and so long as the forming and growing crystals are kept in motion by agitation the crystals do not occlude particles of mud. In the case of the usual ores of alumina the undesirable insoluble mud will contain silica, iron oxide, undissolved alumina, and titania, in the free or combined states.

The crystallization of alum from any solution is a result of the production of a state of supersaturation with respect to the true solubility curve. While such a state may be produced by isothermal evaporation, the more usual case for these substances is that the supersaturation is brought about by lowering of the temperature.

In the usual case, therefore, crystallization is effected by removing heat, and I prefer to use a heat exchanger system to accomplish this abstraction of heat from the solution. The cooling muddy alum suspension is kept in a state of agitation during the cooling operation, the principal object of the agitation being to keep the growing crystals suspended and thereby avoid the formation of agglomerates which would entrap and occlude mud particles.

In applying the principles of this invention, an ore of alumina, in the natural, moist or dried, or dehydrated state, as the case may require, is treated with a sulphuric acid solution containing the necessary potassium or ammonium sulfate to convert the soluble alumina content to the normal alum and at a concentration sufficient to produce preferably a 50% alum solution, heating at 70° C. to boiling, or if desired at higher temperatures under pressure. The conditions for alum solution formation will depend mainly on the particular characteristics of the ore and it is well known that the various grades of bauxite, of clay, and of alunite have specific solubility characteristics with respect to rate of solution in sulphuric acid solutions. The final reaction mixture may be slightly acid, neutral, or basic, which terms refer to the mol ratio of alumina to sulphuric acid. If desired, the ore may be treated with sulphuric acid solution, and the potassium or ammonium sulfate added subsequent to the treatment.

The reaction mixture containing the insoluble material is then subjected to a brief settling period followed by decantation, or other suitable treatment, to remove any coarse insoluble material present. The type of treatment will depend on the original state of comminution of the ore, on the grade of the ore, and on the nature of the gangue minerals, and conditions are preferably so adjusted that the insoluble material which remains suspended in the alum solution after the decanting operation consists of particles finer than 80 mesh.

The turbid alum solution may then be cooled with stirring under conditions adjusted to produce crystals of the desired size, the rates of cooling and agitation depending on the particular crystallization system used, provided the agitation is such as to keep the forming and growing crystals of alum suspended. The alum crystals are then separated from the muddy mother liquor, for example by filtration on a rotary type vacuum salt filter of relatively coarse mesh, or by settling in classifiers or thickeners. The alum crystals may be treated further depending on the intended use. Alumina may be obtained by treating the alum solution produced by this process in an autoclave at 200° C. to produce a basic alum, which is then converted to alumina by calcination and by leaching when potassium alum is the alum manufactured.

The following detailed examples constitute illustrative embodiments in accordance with this invention.

Referring now to Figure 1 of the drawings:

Metalunite (alunite ore which had been ground, for example, to pass a ten mesh screen, and dehydrated by a furnace treatment at 550° C.) and acid solution containing 80 to 120, for example 90, grams of $H_2SO_4$ and 60 to 100, for example 80, grams $K_2SO_4$ per liter were fed continuously at a ratio of one pound of ore per gallon of acid into a 1000 gallon lead-lined vessel I provided with an agitator 2 and heated by steam; the amount of reaction mixture was maintained constant at 500 gallons by means of a suitable overflow device 3. The temperature was maintained at 97 to 98° C., and considerable water was evaporated since the reaction is exothermic. The overflow from the reaction vessel contains about 10 grams/liter of free $H_2SO_4$ and is delivered alternately to one of a series of tanks 4, 5 each provided with an agitator 6, 7 where, on accumulation of 250 gallons, it was agitated for 30 minutes at 97–98° C. with 20 lbs. of metalunite to neutralize the residual acid. The solution was then delivered to an 18 inch by 12 foot rake classifier 8 which separated the coarse insoluble material and yielded an overflow consisting of a muddy alum solution containing in suspension up to about 10 ounces per gallon of particles capable of passing through a 100 mesh screen. This turbid solution, at about 80° C., was pumped into a 2000 gallon tank 9 provided with an agitator 10.

When operation is initiated the tank 9 will contain sufficient cool mother liquor (or a cool suspension of seed crystals) to cause the hot turbid solution from classifier 8 to drop in temperature, upon mixture, and form crystals. Thereafter the inflow of hot turbid solution and cool mother liquor into tank 9 is regulated so as to maintain a temperature therein of 30°–40°C. The agitator 10 is operated so as to maintain the forming and growing crystals in tank 9 constantly in motion.

The magma is discharged from the bottom of tank 9 (continuously when operated as a continuous process or intermittently when operated as a batch process). From tank 9 the magma (being kept constantly in motion) is passed through a heat exchanger 11 which may be cooled by water. A portion of the cooled alum suspension from heat exchanger 11 is delivered to a 1500 gallon tank 12 provided with an agitator 13 and the remainder returned to tank 9. Further cooling and consequent crystallization may take place in tank 12. As long as crystallization of the magma in tank 12 continues the agitator 13 is operated to maintain the crystals in motion. When the temperature of the magma has dropped to 20–25° C. the crystals have the desired size, ranging, for example, from 10 to 100 mesh with the majority between 40 and 60 mesh. In some cases it may be uneconomic to cool the magma to the temperatures indicated; and in such cases, the recovery of alum crystals will be less complete because more of the alum content will remain dissolved in the mother liquor. In other cases, however, it may be desirable to cool the magma below the temperatures indicated with resultant increase in crystal yield at that stage.

From tank 12 the magma was pumped to a 2½ foot by 1 foot rotary salt filter 14, operating at 7 inch gage vacuum and provided with a 50 mesh screen and washing sprays, which separated the potassium alum crystals from the muddy mother liquor. The muddy mother liquor was separated into mud discard and clear alum solution suitable for re-use in the process, by settling in a thickener.

The thus recovered alum crystals will be substantially free of occluded solid impurities from the mother liquor but if, due to deficient agitation at some stage during crystallization, the crystals do contain a measurable amount of such occluded solid impurities the same may be readily purified by dissolving them in water or clarified mother liquor, filtering (which is now readily accomplished because in no event will the crystals contain more than a modicum of solid impurities) and then recrystallizing, if desired.

When it is desired to produce basic potassium alum a 50% solution of the crystals in water or clear mother liquor is made up and treated in an autoclave. Upon calcination and leaching this product yields alumina suitable for the electrolytic manufacture of aluminum.

Figure 2:
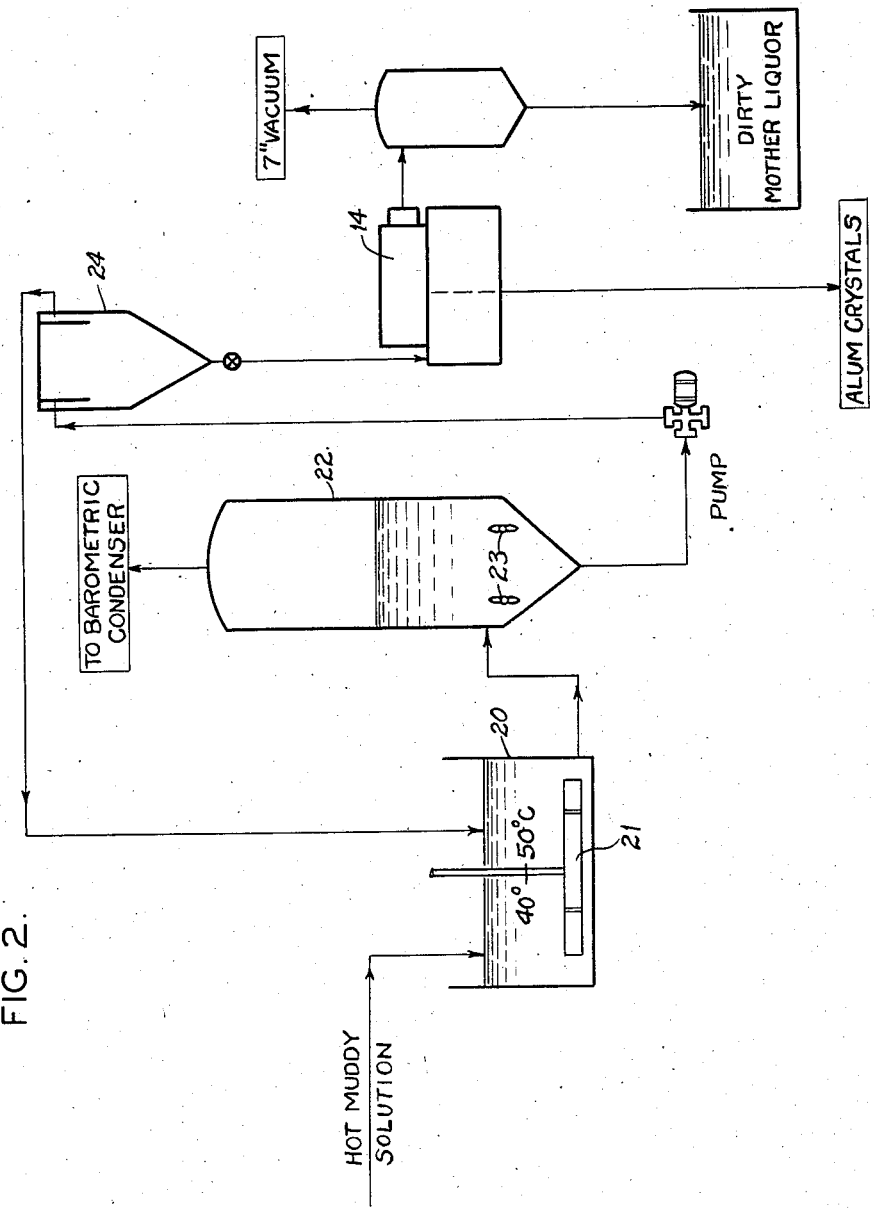

Referring now to Figure 2 of the drawings:

A flow sheet of a modified procedure is shown. In this instance the pregnant alum solution, contaminated with solid impurities from the ore as delivered from the leaching circuit, and after having had the larger of the solid impurities removed by suitable classifier or thickener so that the pregnant solution is at a temperature of about 70–80° C. and contains from 10 to 40 grams of insoluble solid impurities per liter of solution, is delivered to a tank 20 provided with an agitator 21. In the tank 20 the hot turbid alum solution is mixed with cooled mother liquor (or a cooled suspension of alum crystals) so as to attain an equilibrium temperature of 40–50° C. Since the cooling of the hot turbid solution in tank 20 may result in some crystallization therein, the mixture is continuously agitated so as to maintain any forming and growing crystals in motion. From the bottom of tank 20 the magma is delivered to a vacuum crystallizer 22 provided with agitators 23. When the magma, at 40–50° C., enters crystallizer 22 the solution boils. The water vapors are withdrawn and delivered to a barometric condenser, not shown. The loss of heat of vaporization from the boiling alum solution effects a reduction in temperature to about 20–30° C. and crystallization takes place. In the crystallizer 22 the magma undergoing treatment is continuously agitated to maintain the forming and growing crystals in motion.

From the bottom of crystallizer 22 the magma is delivered to a settling cone 24 in which the conditions are so controlled that further crystallization does not take place, or if further crystallization is taking place the flow is regulated so that the forming and growing crystals cannot become quiescent. In the settling cone 24 the bulk of the crystals together with some of the mother liquor containing impurities is discharged from the bottom while the remainder of the magma, which may contain fine crystals of alum, is returned from the top of settling cone 24 to tank 20.

From the bottom of cone 24 the magma is delivered to a salt filter 14, as in the previous embodiment.

Figure 3:
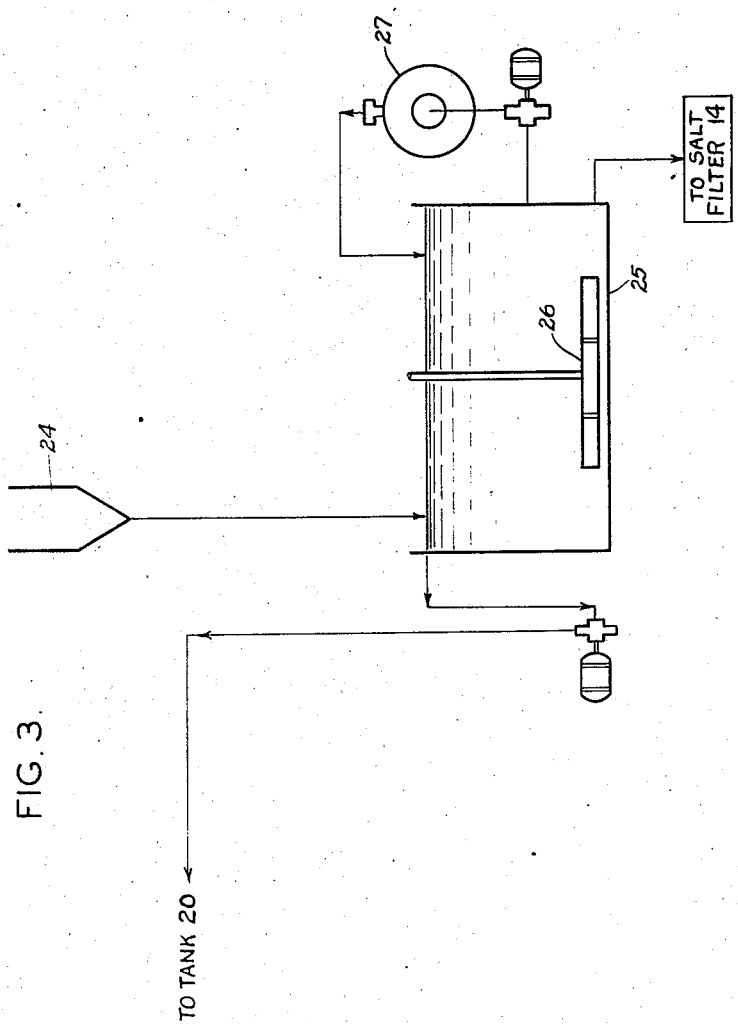

When operating conditions are such that the ultimate minimum temperature of the magma cannot be attained in vacuum crystallizer 22 an additional crystallization step may be interposed between the settling cone 24 and the filter 14, as shown in Figure 3. In this instance the underflow from cone 24 is delivered to a tank 25 provided with an agitator 26, which is operated to maintain the forming and growing crystals in tank 25 continuously in motion. About midway in the height of tank 25 the magma is withdrawn and circulated through a spiral heat exchanger 27 (cooled by water); it being understood that while being circulated through the heat exchanger the forming and growing crystals in the magma are maintained continuously in motion. From the heat exchanger 27 the cooled magma is returned to tank 25 and intermixed with warmer magma from cone 24. From the bottom of tank 25 the magma is withdrawn and delivered to filter 14 while from the top thereof some of the magma may be recirculated to tank 20.

While in the several embodiments above described metalunite has been utilized as the raw material, it will be understood that the process is equally applicable to the treatment of other ores of alumina. For example, finely ground clay, dehydrated at 600° C., may be treated with ten times its weight of 10% (by weight) sulphuric acid solution for one-half hour at 90° C. At the end of this time the solution contained 6 grams of free $H_2SO_4$ per liter. Sufficient ammonium sulfate was added to convert the aluminum sulfate to ammonium alum. The amount in this case corresponded to about half the weight of the clay sample. After removing the readily separable solid impurities as in the case of the previous examples, the hot turbid alum solution was crystallized by reducing the temperature thereof to approximately 20° C. As in the case of the foregoing examples, wherein potassium alum was produced from metalunite, care is exercised that while the solution is undergoing crystallization the forming and growing crystals are maintained in motion by agitation. The apparatus and series of steps described hereinbefore in connection with potassium alum are equally applicable in this case.

It is to be understood that the above examples are illustrative and do not limit the scope of the invention, since variations may be employed in the method of preparing and handling the turbid solutions, in adjusting the concentrations and other crystallization conditions, and in the separation of the alum crystals, which modifications of procedure are contemplated within the scope of the appended claims.

Having now described the invention, what is claimed as new and is desired to be secured by Letters Patent, is:

1. In the manufacture of alum crystals, the process comprising, providing a hot concentrated solution of alum turbid with suspended insoluble impurities derived from an ore of alumina, crystallizing the alum with concurrent agitation to an extent sufficient to maintain the forming and growing alum crystals in suspension in the turbid solution, continuing such agitation throughout the period of crystal formation and growth, and thereafter, without permitting the solution containing alum crystals to become quiescent while under conditions conducive to further crystal formation and growth, separating the formed crystals from the liquor and the suspended impurities.

2. In the manufacture of alum crystals, the process comprising, providing a hot concentrated solution of potassium alum turbid with suspended insoluble impurities derived from an ore of alumina, crystallizing the potassium alum with concurrent agitation to an extent sufficient to maintain the forming and growing potassium alum crystals in suspension in the turbid solution, continuing such agitation throughout the period of crystal formation and growth, and thereafter, without permitting the solution containing alum crystals to become quiescent while under conditions conducive to further crystal formation and growth, separating the formed crystals from the liquor and the suspended impurities.

3. In the manufacture of alum crystals, the process comprising, providing a hot concentrated solution of alum turbid with suspended insoluble impurities derived from an ore of alumina, crystallizing the alum during cooling with concurrent agitation to an extent sufficient to maintain the forming and growing alum crystals in suspension in the turbid solution, continuing such agitation throughout the period of crystal formation and growth, and thereafter, without permitting the solution containing alum crystals to become quiescent while under conditions conducive to further crystal formation and growth, separating the formed crystals from the liquor and the suspended impurities.

4. In the manufacture of alum crystals, the process comprising, providing a hot concentrated solution of alum turbid with suspended insoluble impurities derived from an ore of alumina, mixing the said solution with a relatively cool alum solution with concurrent agitation to an extent sufficient to maintain the forming and growing alum crystals in suspension in the turbid solution, continuing such agitation throughout the period of crystal formation and growth, and thereafter, without permitting the solution containing alum crystals to become quiescent while under conditions conducive to further crystal formation and growth, separating the formed crystals from the liquor and the suspended impurities.

5. In the manufacture of alum crystals, the process comprising, providing a hot concentrated solution of alum turbid with suspended insoluble impurities derived from an ore of alumina, mixing the said solution with a suspension of alum crystals, crystallizing the alum with concurrent agitation to an extent sufficient to maintain the alum crystals in suspension in the turbid solution, continuing such agitation throughout the period of crystal formation and growth, and thereafter, without permitting the solution containing alum crystals to become quiescent while under conditions conducive to further crystal formation and growth, separating the formed crystals from the liquor and the suspended impurities.

6. In the manufacture of alum crystals, the process comprising, providing a hot concentrated solution of alum turbid with suspended insoluble impurities derived from an ore of alumina, crystallizing the alum to form crystals larger than the particles of suspended insoluble impurities during concurrent agitation to an extent sufficient to maintain the alum crystals in suspension in the turbid solution, continuing such agitation throughout the period of crystal formation and growth, and thereafter, without permitting the solution contining alum crystals to become quiescent while under conditions conducive to further crystal formation and growth, separating the formed crystals from the liquor and the suspended impurities.

7. In the manufacture of alum crystals, the process comprising, providing a hot concentrated solution of alum turbid with suspended insoluble impurities derived from an ore of alumina, cooling the said turbid solution to a temperature at which the solution is supersaturated with respect to alum, crystallizing the alum during concurrent agitation to an extent sufficient to maintain the alum crystals in suspension in the turbid solution, continuing such agitation throughout the period of crystal formation and growth, and thereafter, without permitting the solution containing alum crystals to become quiescent while under conditions conducive to further crystal formation and growth, separating the formed crystals from the liquor and the suspended impurities.

8. In the manufacture of alum crystals, the process comprising, providing a hot concentrated solution of alum turbid with suspended insoluble impurities derived from an ore of alumina, mixing said turbid solution at a temperature of about 80° C. with a saturated alum solution at a temperature of about 40° C. during agitation, crystallizing the alum with concurrent agitation to an extent sufficient to maintain the alum crystals in suspension in the turbid solution, continuing such agitation throughout the period of crystal formation and growth, and thereafter, without permitting the solution containing alum crystals to become quiescent while under conditions conducive to further crystal formation and growth, separating the formed crystals from the liquor and the suspended impurities.

9. In the manufacture of alum crystals from an ore of alumina, wherein the ore is treated with a solution of sulphuric acid and a sulfate of a mono-acid base to form an alum solution turbid with finely divided mud of the nature of silica, iron oxide, and titania derived from the ore, the method comprising forming alum crystals during agitation of the unfiltered turbid solution, and separating said crystals from the mother liquor and mud retained in suspension therein.

10. The method as defined in claim 9 in which the sulfate consists of potassium sulfate.

11. The method as defined in claim 9 in which the ore consists of alunite.

12. In a method of manufacturing purified alum from an ore of alumina, wherein the ore is treated to form a hot concentrated alum solution which is turbid with insoluble matter of the nature of silica, iron oxide and titania from the ore, the steps of cooling the unfiltered turbid solution during agitation to form alum crystals, and separating the said crystals from the mother liquor and insoluble matter retained in suspension therein.

13. In a method of manufacturing normal potassium alum wherein an ore of alumina is treated with a solution of sulphuric acid and potassium sulfate to form a hot concentrated alum solution which is turbid with insoluble matter of the nature of silica, iron oxide, and titania from the ore, the steps of admixing said unfiltered turbid solution with a suspension of alum seed crystals, cooling the said admixture during agitation to crystallize the alum, and separating the crystals from the mother liquor and insoluble matter retained in suspension therein.

14. In a method of manufacturing normal alum wherein an ore of alumina is treated to form a hot concentrated alum solution containing particles of insoluble matter of the nature of silica, iron oxide, and titania from the ore in suspension, the steps of cooling the said unfiltered turbid solution during agitation to form alum crystals larger than the particles of insoluble matter, and passing the resulting mixture of crystals and turbid mother liquor over a screen provided with openings larger than the said particles and smaller than the said crystals.

15. In the manufacture of purified alum crystals from a hot unsaturated alum solution containing particles of insoluble matter of the nature of silica, iron oxide, and titania in suspension, the process comprising cooling the unfiltered turbid solution during agitation to a temperature at which the solution is super-saturated with respect to alum, continuing the agitation to form alum crystals, and separating the crystals from the mother liquor and contaminant retained in suspension therein.

16. In a method for the manufacture of potassium alum from an ore of alumina wherein the ore is treated to form a hot unsaturated alum solution containing particles finer than 100 mesh of insoluble matter of the nature of silica, iron oxide, and titania in suspension, the steps of admixing said unfiltered solution at a temperature of about 80° C. with a suspension of alum crystals at a temperature of about 40° C. during agitation, cooling said admixture to ordinary temperature to form alum crystals of 10 to 100 mesh size, and separating said crystals from the mother liquor and insoluble matter retained in suspension therein.

ARTHUR FLEISCHER.